March 6, 1951 V. F. STEWART 2,543,878
FLUID CONTROLLED TRANSMISSION
Filed Jan. 11, 1949 3 Sheets-Sheet 1
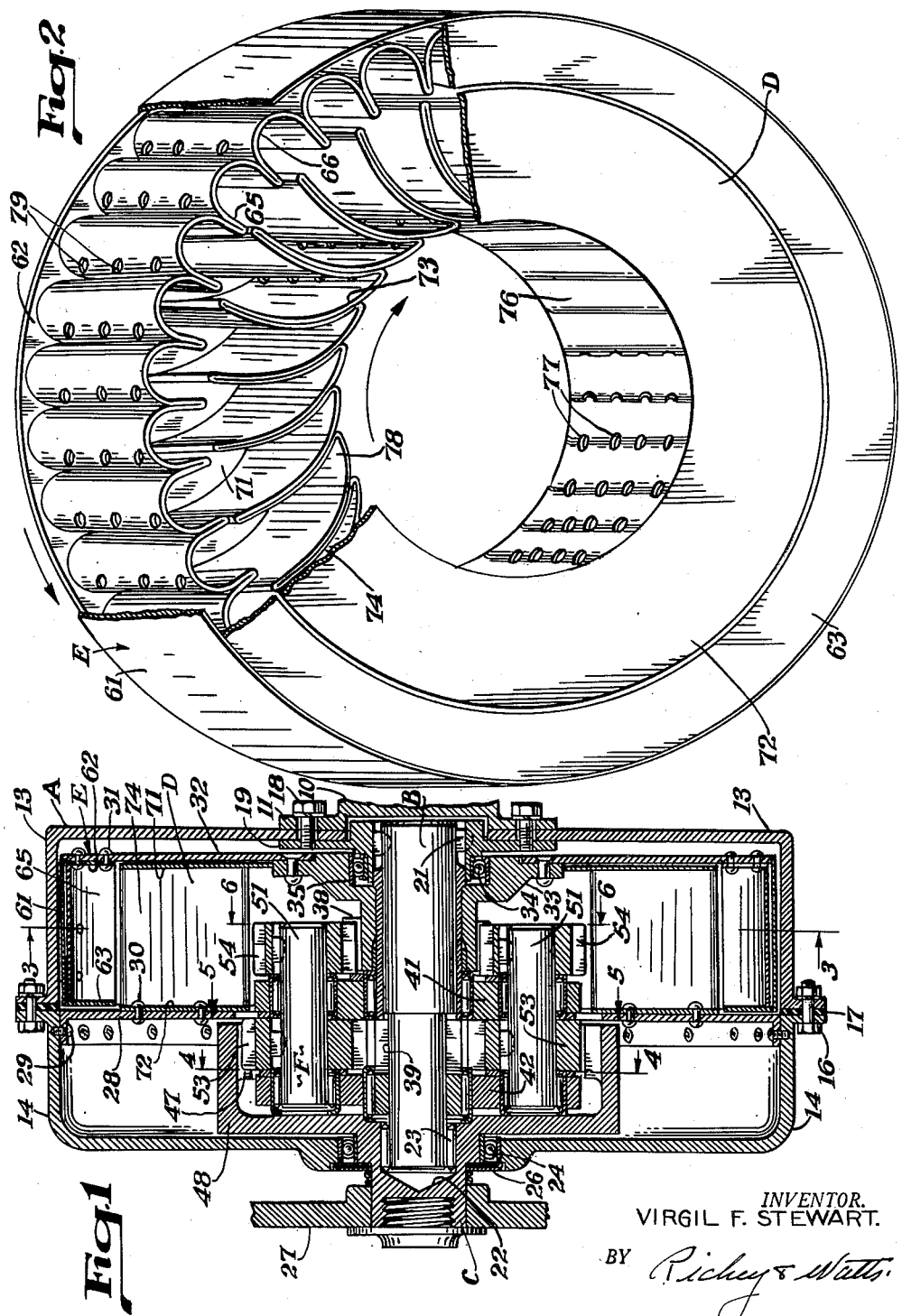
INVENTOR.
VIRGIL F. STEWART.
BY Richey & Watts
ATTORNEYS.

March 6, 1951     V. F. STEWART     2,543,878
FLUID CONTROLLED TRANSMISSION
Filed Jan. 11, 1949     3 Sheets-Sheet 2
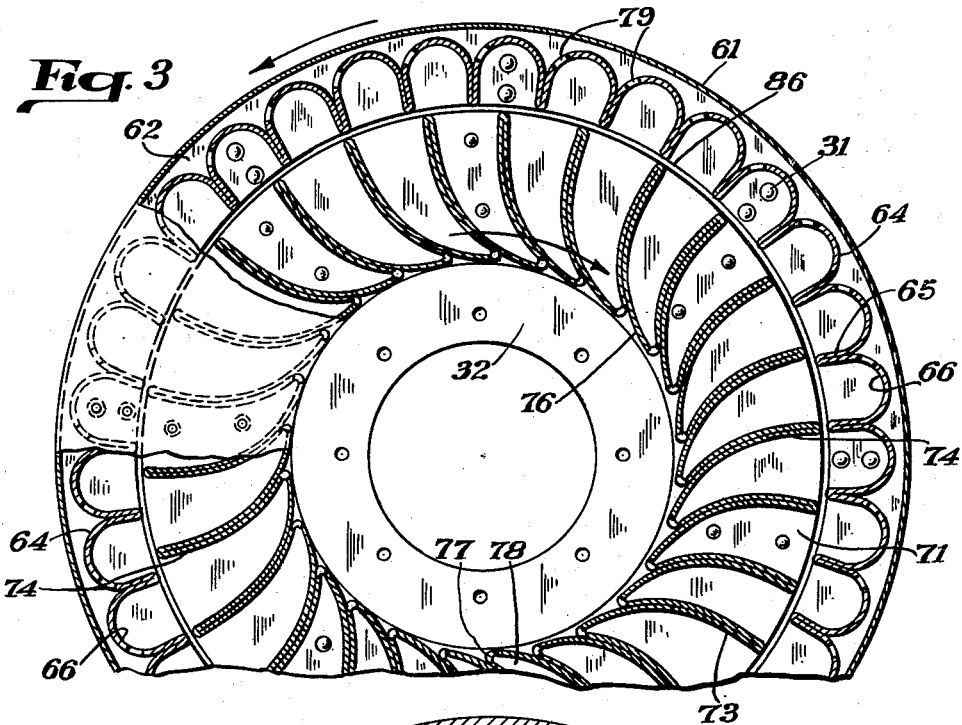
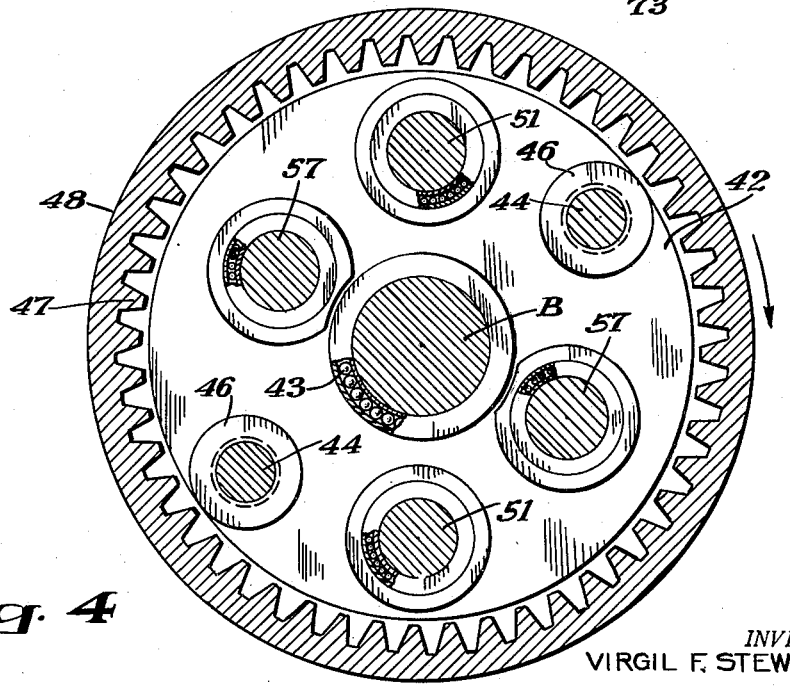
INVENTOR.
VIRGIL F. STEWART.
BY
*ATTORNEYS.*

INVENTOR.
VIRGIL F. STEWART.

Patented Mar. 6, 1951

2,543,878

UNITED STATES PATENT OFFICE 2,543,878

FLUID CONTROLLED TRANSMISSION

Virgil F. Stewart, East Cleveland, Ohio

Application January 11, 1949, Serial No. 70,321

8 Claims. (Cl. 74—688)

This invention is directed to a fluid-controlled transmission. It is particularly adapted for the transmission of power from the engines of automotive vehicles such as passenger cars, trucks, and buses. However, the invention may desirably be employed in various environments in which there exists the problem of transmitting mechanical energy from a prime mover to a driven device.

The principal object of the invention is to provide a flexibility and variation of transmission speed ratio.

A primary object of the invention also is to achieve the principal object automatically and without manual gear changing.

An object of the invention is to provide a power transmission mechanism which involves the principal of diminishing ratio and increasing ratio through the use of a fluid coupling and fixed gearing in constant mesh, the ratio diminishing or increasing in relation to the applied load.

A further object of the invention is to provide a compact automatic transmission which is particularly well suited to the requirements of vehicles driven by internal combustion engines.

A very important feature of the engine is a new and improved hydrodynamic coupling and a further basic object of the invention is the improvement of hydraulic couplings.

Other objects and advantages of the invention more or less ancillary in nature will be apparent to those skilled in the art from the appended description of the preferred embodiment of the invention and the accompanying drawings in which:

Fig. 1 is a longitudinal section of a transmission in accordance with the invention;

Fig. 2 is a view in cabinet projection of the fluid coupling of the invention with certain parts cut away;

Fig. 3 is a sectional view of the fluid coupling taken on the plane indicated in Fig. 1; and Figs. 4, 5, and 6 are sectional views of the epicyclic gearing taken on the planes indicated in Fig. 1.

Figure 5:
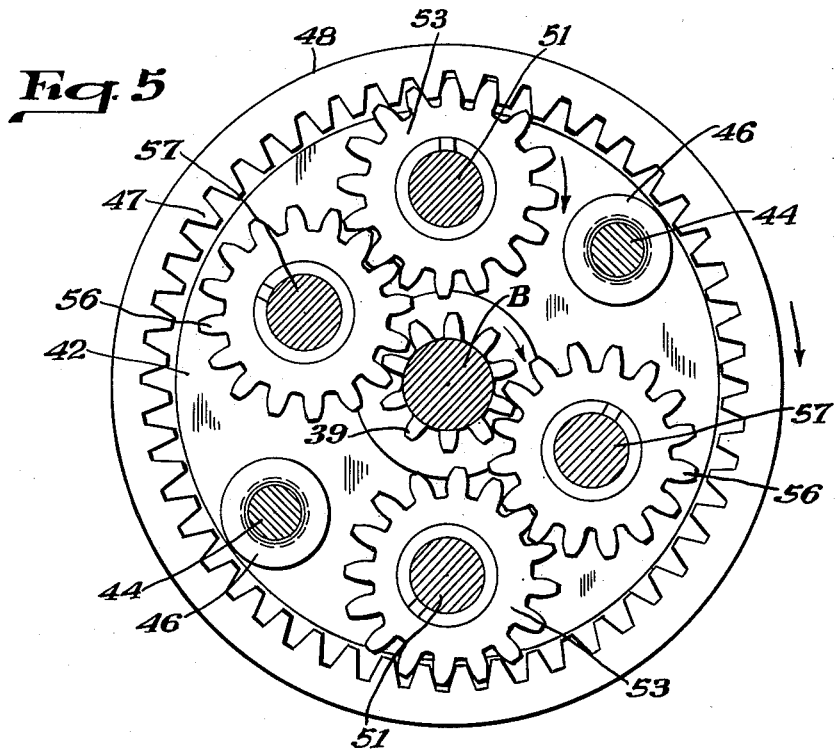
Figure 6:
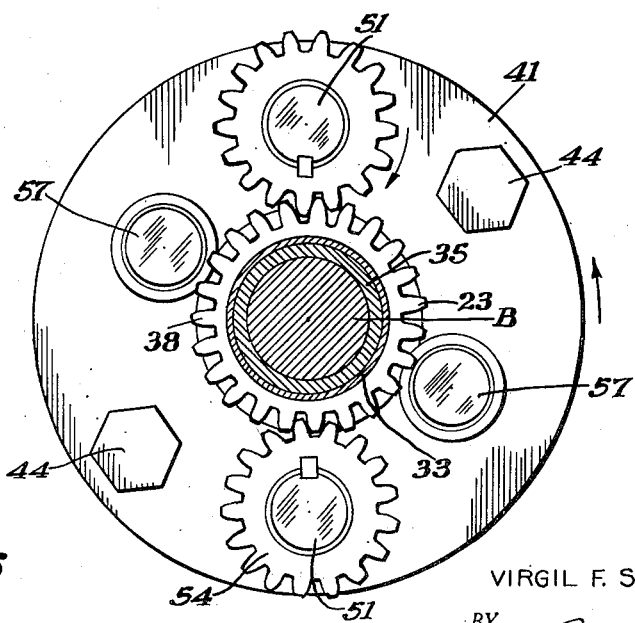

By way of introduction to the more detailed description of the preferred embodiment of the invention it may be pointed out that the principal parts of the assembly include a fluid-tight casing A which is coupled to and rotates with the input to the transmission, the main shaft B likewise coupled to the input and an output shaft C. The fluid coupling comprises a driving rotor D which turns with the input shaft and casing and a driven rotor E which is coupled to both the input shaft B and the output shaft C through a chain of epicyclic gearing indicated generally at F. The casing A is substantially filled with suitable fluid, which may be soil. When the internal combustion engine or other power source turns the input shaft B and casing A at a given speed, it may drive the output shaft C at a variety of speeds, the speed of the output shaft being determined by the load on the shaft. Thus, for example, if the drive be considered as incorporated in an automobile, when the vehicle is standing and the engine is turning at idling speed, and it is desired to accelerate the vehicle, the motor is accelerated and an increasing torque is delivered to the output shaft C. The output shaft will then accelerate the vehicle with it until the speed of the output shaft approaches that of the input shaft. The greater difference between the speeds of the input and output shafts, the greater the opposition between the members of the fluid coupling, and the greater the torque exerted for a given input shaft speed. In other words, the fluid coupling absorbs the counteracting force and diminishes the over-all transmission ratio accordingly.

The general mechanical features of the invention, including the gearing, will be described in some detail, after which the structure of the fluid coupling and the over-all characteristics of the apparatus will be described. The drive shaft 10, which may be the end of an internal combustion engine crankshaft, terminates in a flange 11. The casing A which is of a cylindrical form comprises two sections 13 and 14 which are flanged so as to be conveniently united by bolts 16, and may have a gasket 17 interposed between the flanges. The casing section 13 is coupled to the crankshaft flange 11 by machine screws 18 which are received in a disk 19 within which is keyed the main shaft B of the transmission, as by keys 21. The output shaft C is formed with an internal bore 22 within which needle bearings 23 provide a support for the end of the main shaft B. The output shaft is provided with ball bearings 24 and shaft seals 26 for the retention of the hydraulic fluid within the casing. The entire transmission may be supported by its connection to the crankshaft or it may be provided with an outboard bearing such as a bearing in a fixed member indicated generally as 27 in Fig. 1.

An annular plate 28 secured to the casing section 14 by screws 29 bears the driving rotor D which may be secured to the ring 28 by rivets 30. The driven rotor E of the fluid coupling is secured by rivets 31 to a disk 32 riveted to a flanged hollow shaft member 33, which is journalled on the main shaft B by a ball bearing 34 and a sleeve 35. A rearward extension of the member 33 is formed with an integral spur gear 38, which is a sun gear of a compound epicyclic gear train to which the driven rotor E is coupled. The main shaft B is provided with a sun gear 39 which may be formed integral therewith or mounted thereon. The two sun gears 38 and 39 mesh with planet gears carried by two spider disks 41 and 42 journalled on the main shaft B preferably by needle bearings. The spiders 41 and 42 are essentially disks of considerable thickness in order to support the planet gear shafts and are fixed together by cap screws 44 passing through the plate 41 and threaded into the spider 42. Separating sleeves 46 fitted over the bolts 44 maintain the spacing between the disks 41 and 42 and increase the rigidity of the connection between them. An integral ring gear 47 is formed on a drum 48 integral with the output shaft C and partially enclosing the spider structure. Two shafts 51 closing the spider structure. Two shafts 51 mounted in the spider plates 41 and 42 by needle bearings support spur gears 53 and 54 meshing with the ring gear 47 and the sun gear 38 respectively, the gears 53 and 54 being keyed to the shafts 51.

Oppositely disposed idler gears 56 meshing with the gears 53 and the gear 39 are supported on shafts 57 extending between the two spider plates 41 and 42 and rotatably supported therein by needle bearings.

From the foregoing description of the gearing, it is believed that its operation will be apparent, but it may be pointed out that rotation of the driving shaft 10 rotates the main shaft B and in turn the gear 39. Assuming for the moment that the output shaft C is stationary, the ring gear 47 will likewise be stationary and rotation of the gear 39 will drive the idler gears 56 and planet gears 53, causing the latter to roll around the ring gear 47, thus rotating the spider assembly about the axis of the main shaft. The gear 38 which is coupled to the driven rotor member E will be rotated both by the rotation of the spider and by the rotation of the planet gears 54 which are keyed to the planet gears 53 as previously described. The driving rotor member D will be driven directly by the input, being fixed to the casing, and the driven rotor member E will be coupled to both the input and output through the gear train.

If the output shaft C is released it may then turn; and its increase in speed for a given input speed will be accompanied by a decrease in the speed of the inner rotor with respect to the outer rotor. As a limiting case, if we assume the outer rotor E locked to and turning with the inner rotor D, the epicyclic gearing will be locked, the entire gear assembly turning together as a unit and the output shaft C turning at the same speed as the input 10. If the output shaft C is positively driven so as to overrun the input 10, the relative rotation of the members D and E will be reversed with respect to that which obtains when the input exceeds the output in speed.

As will be apparent to those apprised of the characteristics of hydrodynamic couplings in general, a wide range of speeds of the output for any given speed of the input is offered by the mechanism, the exact values depending upon the specific characteristics of the coupling, the varying ratios of the gearing, and the torque of the load.

The basic function of the epicyclic gearing is to increase the speed differential between the members of the hydraulic coupling over that between the input and output shafts and the characteristics of the transmission may be modified to secure the desired performance in a given system including a prime mover and a load of known characteristics by varying the ratios of gearing so as to secure a greater or lesser multiplication of speed in the coupling. In many known hydrodynamic couplings the driving member or pump is directly connected to the input shaft and the driven member or turbine is directly connected to the output shaft. With such installations the speed differential between these two members, upon which the torque principally depends, must equal the speed difference between the input and output shafts. By increasing the speed difference of the coupling members, a tighter coupling between the power source and the load is effected and greater power may be transmitted with a hydraulic coupling of a given size and having given torque-slip characteristics.

In the particular embodiment with which the invention is illustrated herein, the sun gears 38 and 39 have twenty-three and ten teeth, respectively. The sun gears 54 have seventeen teeth and the sun gears 53 sixteen teeth. The ring gear 47 has forty-eight teeth, and the intermediate or idler gears 56 are formed with sixteen teeth, although this number is immaterial. With this particular gearing it may readily be determined by calculation that the difference of speed between the two coupling members D and E is approximately 1.85 times the difference in speed between the input and output of the coupling, the driven rotor E rotating in reverse direction to the driving rotor D when the transmission input is driven and the output is stationary.

The characteristics of epicyclic gear trains make it easily possible to vary this ratio very considerably without radical alterations in the proportions of the gear system by varying the ratio of individual sets of gears as desired.

The hydraulic coupling comprising the driving rotor D and driven rotor E is most clearly illustrated in Figs. 2 and 3. The rotor E comprises a rim 61 with inwardly directed flanges 62 and 63, the former being secured to the disk 32 by rivets 31 as previously described. The flanges 62 and 63 may be integral with the rim 61 or may be secured thereto by spot welding or any other suitable manner. A plurality of baffles are formed by an outer member 64 which is preferably formed by a continuous strip bent to form a relatively large number of radial inwardly directed baffles 65 with cylindrically curved pockets 66 between the baffles. The baffle member 64 is preferably spot-welded to the flanges 62 and 63 and slightly spaced from the rim 61. The number of baffles 65 may be varied in accordance with the size of the coupling and the characteristics desired but the number should preferably be relatively large, thirty-three being illustrated in the present embodiment.

The rotor D is generally similar in the character of construction employed to the rotor E but the baffles are of a different form. The rotor comprises front and rear annular disks 71 and 72, respectively, the latter being secured to the disk 28 by rivets 30, as illustrated in Fig. 1, and a strip 73 folded and bent to form a set of baffles extending around the rotor. The baffle members comprise a plurality of fins 74, the outer portion of each being plane and substantially radial, while the inner portion is curved so that the forward face of the blade is convex when viewed from a point in advance of the blade as it rotates. The baffle member 73 includes portions 76 extending from each baffle 74 to the adjacent baffle and thus forming an inner boundary of the rotor. A plurality of holes 77, preferably four in number as illustrated in Figs. 2 and 3, are provided at the inmost point of each of the chambers 78 between the baffles 74. These openings provide an entrance for the oil between the baffles and assure the oil supply to the coupling member under the influence of the centrifugal action of the mechanism during operation. The structure further eliminates the presence of any air in the transmission since it is concentrated by centrifugal force adjacent the axis. The normal direction of rotation of the driving rotor is clockwise as viewed in Figs. 2 and 3, and the direction of rotation of the driven rotor is counter-clockwise when the output shaft is stationary. As the speed of the output shaft approaches that of the input shaft, the direction of rotation of the outer baffle member reverses and its speed under conditions of light load approaches that of the inner baffle member.

Oil ports 79 are provided in the outer baffle members at points displaced somewhat in a counter-clockwise direction from the median plane of the pockets 66. The ports 79 provide equalization of pressures in the casing and further provide volumetric equality of the fluid when the baffles 65 and 74 are directly opposed. As will be apparent from the drawings, the number of baffles in the two rotors are different so that only a relatively small number of the baffles may be opposed at any given time.

The face of each baffle or fin 74 which leads in the normal direction of rotation of the rotor D (clockwise in Fig. 2) may be termed the forward face. As stated, this face is concave, and it is also back-raked; in other words, the inner edges of the baffles lead or precede the outer edges as the rotor D turns.

As will be readily understood, in normal operation of the device rotation of the engine drives the rotor D, which imparts to the oil a tangential component of velocity in the direction of its rotation and imparts a centrifugal force urging the fluid outwardly from the center. The force thus produced is increased by the backward rake and curved form of the blades, which create a radial force against the oil. The oil is thus projected off the leading edge of each inner blade with an outward radial component of velocity and a forward tangential component. The driven rotor will normally be either rotating reversely to the driving rotor or at less speed in the same direction, and, therefore, relatively to the driving rotor, it will rotate in a counter-clockwise direction in Figs. 2 and 3. Thus the oil projected by the driving rotor will impinge upon the trailing faces of the outer baffles 65, the inertia of the fluid imparting a rotational force to this rotor tending to carry it along with the driving rotor. Fluid striking the radial surfaces of the outer baffles 65 will normally flow within the curved surface of the pocket 66 and be projected off the leading face of the next succeeding baffle 65 back into the inner rotor for a repetition of the action previously described. At the instants when the vanes of the inner and outer baffles are in opposition, for example, as indicated at 86 in Fig. 3, the fluid may then pass through the ports 79 which afford a relief against percussive action of the fluid and undesirable turbulence.

Obviously, the force delivered to the driven baffle member E by the oil projected against it will be determined very largely by the relative speed of the two rotors, which determines the velocity of impact of the oil against the baffles 65. When the speed of the two members D and E is the same there will be no driving force, but as a load is imposed upon the outer baffle E it will begin to rotate relative to the inner baffle and the torque developed thereby will tend to carry the load.

Since the relation between the speeds of the output and input shafts of the transmission depends upon the relative speeds of the two coupling rotors the power plant as a whole, by which is meant the engine and transmission, will adapt itself to the characteristics of loads of very high inertia such as are presented by starting loads of motor vehicles. Thus, for example, when the engine is accelerated with the vehicle standing still there are high relative speeds of the coupling members and high torque to accelerate the vehicle. As the load accelerates the engine may be accelerated somewhat, but ultimately, as the vehicle approaches normal driving speed the torque will correspondingly decrease and with it the load on the engine so that under normal running conditions on level road the speed ratio of the input and output shaft will approach unity.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A power transmission device comprising a hydraulic coupling including two elements relatively rotatable about a common axis and having a mutual torque reaction; a power input shaft and a power output shaft concentric with the said axis, one of the elements being directly coupled to one of the said shafts; and an epicyclic gearing coupled to both the said shafts and the other said element, comprising a ring gear fixed on one of the said shafts, a spider journalled for rotation about the said axis, a first gear fixed on the other said shaft, a second gear rotatable on the spider meshing with the first gear, a third gear rotatable on the spider meshing with the second gear and ring gear, a fourth gear on the spider rotated by the third gear, and a fifth gear journalled for rotation about the said axis and driven by the fourth gear, the fifth gear being coupled to the other element.

2. A power transmission device comprising a casing adapted for rotation about an axis by a power source, a hydraulic coupling comprising a driving rotor fixed to the casing and a driven rotor disposed adjacent the driving rotor, means mounting the driven rotor for free rotation with respect to the driving rotor, an output shaft journalled in the casing, a ring gear fixed on the output shaft, a main shaft fixed to the casing, a spider journalled on the main shaft, a first gear fixed on the main shaft, a second gear rotatable on the spider meshing with the first gear, a third gear rotatable on the spider meshing with the second gear and ring gear, a fourth gear on the spider rotated by the third gear, and a fifth gear journalled on the main shaft and driven by the fourth gear, the fifth gear being coupled to the driven rotor.

3. A power transmission device comprising a casing adapted for rotation about an axis by a power source, a hydraulic coupling comprising a driving rotor fixed to the casing and a driven rotor disposed around the circumference of the driving rotor, the rotors being concentric with the axis, means mounting the driven rotor for free rotation with respect to the driving rotor, an output shaft journalled in the casing, a ring gear fixed on the output shaft, a main shaft fixed to the casing, a spider journalled on the main shaft, a first gear fixed on the main shaft, a second gear rotatable on the spider meshing with the first gear, a third gear rotatable on the spider meshing with the second gear and ring gear, a fourth gear on the spider rotated by the third gear, and a fifth gear fixed on the said means driven by the fourth gear.

4. A power transmission device comprising a casing adapted for rotation about an axis by a power source, a hydraulic coupling comprising a driving rotor fixed to the casing and a driven rotor disposed around the circumference of the driving rotor, means mounting the driven rotor for free rotation with respect to the driving rotor, an output shaft journalled in the casing, a first gear fixed on the output shaft, a main shaft fixed to the casing, a second gear fixed on the main shaft, a third gear fixed on the said means, and epicyclic gearing means interconnecting the said gears, said gearing means being constructed and arranged so that relative rotation at a given rate between the casing and the output shaft enforces relative rotation at a higher rate between the rotors.

5. A hydraulic coupling comprising a driving rotor and a driven rotor mounted for rotation about a common axis and a closed casing containing the rotors, the driving rotor comprising annular end plates and a plurality of baffles joining the end plates, the baffles being formed with concave back-raked forward faces, the radially inward ends of the baffles meeting to define pockets between the baffles, oil ports being provided at the radially inner ends of the pockets, the driven rotor being disposed radially outwardly of the driving rotor and comprising annular end plates, baffle members directed inwardly and united at the outer ends to form semi-cylindrical chambers, restricted oil ports being provided in the outer part of the chambers, and a generally cylindrical rim spaced from the baffle members.

6. A hydraulic coupling comprising a driving rotor and a driven rotor mounted for rotation about a common axis and a closed casing containing the rotors, the driving rotor comprising annular end plates and a plurality of baffles joining the end plates, the baffles being formed with concave back-raked forward faces, the outer portion of the faces being plane and generally radial, the radially inward ends of the baffles meeting to define pockets between the baffles, oil ports being provided at the radially inner ends of the pockets, the driven rotor being disposed radially outwardly of the driving rotor and comprising annular end plates, and baffle members directed inwardly and united at the outer ends to form cylindrical chambers, oil ports being provided in the outer part of the chambers.

7. A hydraulic coupling comprising a driving rotor and a driven rotor mounted for rotation about a common axis and a closed casing containing the rotors, the driving rotor comprising annular end plates and a plurality of baffles joining the end plates, the baffles being formed with concave back-raked forward faces, the radially inward ends of the baffles meeting to define pockets between the baffles, oil ports being provided at the radially inner ends of the pockets, the driven rotor being disposed radially outwardly of the driving rotor and comprising annular end plates, baffle members idrected inwardly and united at the outer ends to form semi-cylindrical chambers, restricted oil ports being provided in the outer part of the chambers.

8. A hydraulic coupling comprising a driving rotor and a driven rotor mounted for rotation about a common axis and a closed casing containing the rotors, the driving rotor comprising annular end plates and a plurality of baffles joining the end plates, the baffles being formed with concave back-raked forward faces, the radially inward ends of the baffles meeting to define pockets between the baffles, the driven rotor being disposed radially outwardly of the driving rotor and comprising annular end plates and baffle members directed inwardly and united at the outer ends to form semi-cylindrical chambers.

VIRGIL F. STEWART.

REFERENCES CITED

The following references are of record in the file of this patent:

UNITED STATES PATENTS

| Number | Name | Date |
|---|---|---|
| 1,764,849 | O'Connor | June 17, 1930 |
| 1,888,881 | Murphy | Nov. 22, 1932 |
| 2,284,934 | Watson | June 2, 1942 |
| 2,315,130 | Peterson | Mar. 30, 1943 |

FOREIGN PATENTS

| Number | Country | Date |
|---|---|---|
| 212,925 | Great Britain | Nov. 6, 1924 |
| 442,562 | Great Britain | Aug. 13, 1935 |
| 794,008 | France | Dec. 2, 1935 |

Certificate of Correction

Patent No. 2,543,878

March 6, 1951

VIRGIL F. STEWART

It is hereby certified that error appears in the printed specification of the above numbered patent requiring correction as follows:

Column 2, line 3, for the word "soil" read *oil*; column 3, line 19, for "integral ring" read *internal ring*; lines 21 and 22, strike out "Two shafts 51 closing the spider structure.":

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*